US008157630B2

(12) United States Patent
Herrmann et al.

(10) Patent No.: US 8,157,630 B2
(45) Date of Patent: Apr. 17, 2012

(54) GAME OF SKILL AND CHANCE AND SYSTEM AND METHOD FOR PLAYING GAMES OF SKILL AND CHANCE

(75) Inventors: Mark E. Herrmann, Wellesley, MA (US); Steven N. Kane, Brookline, MA (US); Stuart Roseman, Boston, MA (US); Jason Yanowitz, Amherst, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 2153 days.

(21) Appl. No.: 10/961,833

(22) Filed: Oct. 8, 2004

(65) Prior Publication Data

US 2005/0143156 A1 Jun. 30, 2005

Related U.S. Application Data

(60) Provisional application No. 60/515,598, filed on Oct. 29, 2003.

(51) Int. Cl.
*A63F 13/00* (2006.01)
*A63F 9/24* (2006.01)
*A63B 71/06* (2006.01)

(52) U.S. Cl. .................. 463/9; 463/11; 463/12; 463/13; 463/23; 273/138.1; 273/139; 273/317.1; 273/461

(58) Field of Classification Search .................. 463/9, 1, 463/7, 10–14, 16–23, 25–27, 29–34, 42; 273/138.1, 138.2, 139, 141 A, 142 B, 142 C, 273/142 J, 317.1, 453, 460–461; *A63F 13/00, A63F 13/12, 9/24; A63B 71/06*
See application file for complete search history.

(56) References Cited

U.S. PATENT DOCUMENTS

| | | | | | |
|---|---|---|---|---|---|
| 3,589,729 | A | * | 6/1971 | Girard | 273/269 |
| 5,531,440 | A | * | 7/1996 | Dabrowski et al. | 463/12 |
| 5,624,119 | A | * | 4/1997 | Leake | 273/269 |
| 5,630,753 | A | * | 5/1997 | Fuchs | 463/9 |
| 5,769,716 | A | * | 6/1998 | Saffari et al. | 463/20 |
| 5,971,849 | A | * | 10/1999 | Falciglia | 463/16 |
| 6,093,104 | A | * | 7/2000 | Kasahara et al. | 463/30 |
| 6,217,448 | B1 | * | 4/2001 | Olsen | 463/25 |
| 6,257,979 | B1 | * | 7/2001 | Walker et al. | 463/13 |
| 6,413,161 | B1 | * | 7/2002 | Baerlocher et al. | 463/20 |
| 6,585,591 | B1 | * | 7/2003 | Baerlocher et al. | 463/25 |
| 6,632,140 | B2 | * | 10/2003 | Berman et al. | 463/18 |
| 6,645,071 | B2 | * | 11/2003 | Perrie et al. | 463/16 |
| 6,802,775 | B2 | * | 10/2004 | Baerlocher et al. | 463/16 |
| 6,855,054 | B2 | * | 2/2005 | White et al. | 463/21 |

(Continued)

OTHER PUBLICATIONS

"Dynomite", Jun. 7, 2008, www.popcap.com/games/free/dynomite (whole game), (since the reference is an online game and the cited portions of the game are mainly how the game functions, no hard copy is submitted with the office action, applicant is advised to view the website and play the game).*

(Continued)

*Primary Examiner* — Arthur O. Hall
(74) *Attorney, Agent, or Firm* — Dority & Manning, P.A.

(57) ABSTRACT

A game of skill and chance is provided in which a random element selection device is used to indicate an element a player or computer is to remove from a grid of objects. When a predetermined outcome in the game is obtained, then the player is a winner if the outcome is attained within a predetermined period. A player may play against the odds or may play against other players.

82 Claims, 8 Drawing Sheets

U.S. PATENT DOCUMENTS 6,910,962 B2 * 6/2005 Marks et al. .................... 463/16
6,935,947 B1 * 8/2005 Singer et al. .................... 463/16
6,986,710 B2 * 1/2006 Baerlocher et al. ............. 463/16
6,997,804 B2 * 2/2006 Berman .......................... 463/20
7,004,835 B2 * 2/2006 Baerlocher ..................... 463/16
7,104,885 B2 * 9/2006 Reimer ............................. 463/9
7,104,886 B2 * 9/2006 Baerlocher et al. ............. 463/16
7,144,322 B2 * 12/2006 Gomez et al. ................... 463/20
7,198,570 B2 * 4/2007 Rodgers et al. ................. 463/20
7,887,407 B1 * 2/2011 Singer et al. .................... 463/19
7,914,376 B2 * 3/2011 Walker et al. ................... 463/25
7,918,730 B2 * 4/2011 Brosnan et al. ................. 463/32
2001/0008842 A1 * 7/2001 Walker et al. ................... 463/16
2002/0072412 A1 * 6/2002 Young et al. .................... 463/42
2002/0142819 A1 * 10/2002 Reimer ............................. 463/9
2003/0040355 A1 * 2/2003 Baerlocher ..................... 463/20
2003/0119576 A1 * 6/2003 McClintic et al. .............. 463/20
2003/0224848 A1 * 12/2003 Baerlocher et al. ............. 463/16
2005/0043075 A1 * 2/2005 Lin et al. ........................... 463/9
2005/0143156 A1 * 6/2005 Herrmann et al. ................ 463/9

OTHER PUBLICATIONS

Web Archive www.popcap.com, Sep. 14, 2002, http://web.archive.org/web/20020914075219/http://www.popcap.com/ (adobe screenshot of the website provided).*
www.popcap.com/games/free/dynomite, Internet game Dynomite, Sep. 19, 2002.

* cited by examiner

GAME OF SKILL AND CHANCE AND SYSTEM AND METHOD FOR PLAYING GAMES OF SKILL AND CHANCE

RELATED APPLICATIONS

This application claims priority under 35 U.S.C.§119(e) to U.S. Provisional Application Ser. No. 60/515,598 entitled "GAME OF SKILL AND CHANCE AND SYSTEM AND METHOD FOR PLAYING GAMES OF SKILL AND CHANCE," filed on Oct. 29, 2003, which is herein incorporated by reference in its entirety.

FIELD OF THE INVENTION

The present invention relates to games of skill and chance and, more particularly, to methods of and systems for playing games of skill and chance.

DESCRIPTION OF THE RELATED ART

A few electronic games have the goal for a player to remove some or all of the elements on a grid of random color elements. Two such games are the "Bubble-O-Matic" game provided on the Internet website gamesville.com and the "Poppit!" game provided on the Internet website pogo.com. The "Bubble-O-Matic" game includes a 12 by 14 grid of variously colored bubbles, and extra value items are placed in some of these bubbles. During game play, a player selects and removes two or more bubbles of the same color that are touching. As bubbles are popped, lower bubbles in the same column move up. As columns are eliminated, remaining columns move together. Points are earned for each bubble popped and for each extra value item released from its bubble. A minimum number of points must be earned in a game to keep the points. If a specified number of points is accumulated over consecutive games, then a player earns an entry into a daily sweepstake.

The "Poppit!" game is similar to the "Bubble-O-Matic" game. The "Poppit!" game includes a 10 by 15 grid of colored balloons. Bonus token items are located behind balloons on the grid. A player selects and removes two or more balloons of the same color that are touching. As balloons are popped, lower balloons move up. As columns are eliminated, remaining columns move together. When a hidden item is no longer covered by balloons, the item falls to the bottom of the game screen. A player gains points when all hidden items are uncovered. Additional points are earned if the screen is cleared of the remaining balloons.

There is a present and recurring need for new games of skill and chance that are easy to understand, are easy to play, and are accessible but are varied enough to maintain the interest of players. Such a game is needed to attract new game players and to provide existing players enough stimulation to continue to play.

SUMMARY OF THE INVENTION

According to one aspect of the invention, a method for conducting a game is provided. The game includes one or more players and involves, for each of the one or more players, a grid of objects wherein each object is chosen from a predetermined set of elements. The method comprises acts of a) providing for randomly selecting one element from a predetermined set of elements, and b) providing for removing the selected element from the grid of objects, wherein acts a) and b) are repeated until a predetermined winning outcome or a predetermined maximum number of repetitions of acts a) and b) are attained. According to one embodiment of the invention, the selected element in act a) is removed by the player from the grid of objects. According to another embodiment, the selected element in act a) is automatically removed by the computer from the grid of objects. According to another embodiment, the game session is conducted without interaction of the at least one player. According to another embodiment, only one element selected by act a) is removed from the grid of objects. According to another embodiment, at least some of the selected elements by act a) is removed from the grid of objects. According to another embodiment, elements are arranged into one or more predetermined groups in the grid of objects. According to another embodiment, the method further comprises an act of c) adding one or more new elements to the grid of objects after performing act b). According to another embodiment, act c) occurs after each occurrence of act b). According to another embodiment, act c) occurs after only predetermined occurrences of act b).

According to one embodiment of the invention, the predetermined winning outcome is to remove all elements from the grid of objects. According to another embodiment, the predetermined winning outcome is to remove all elements from one or more of the predetermined groups from the grid of objects. According to another embodiment, the one or more players are permitted to play against each other. According to another embodiment, the winning player is the first to attain the predetermined winning outcome. According to another embodiment, each player plays the game to attain the predetermined winning outcome prior to a predetermined maximum number of repetitions of acts a) and b) is attained. According to another embodiment, each player begins the game with a same arrangement of elements in the grid of objects. According to another embodiment, each player begins the game with a different arrangement of elements in the grid of objects. According to another embodiment, the elements in each player's grid of objects is randomly determined from a predetermined set of elements by a computer. According to another embodiment, the one or more player in the game uses an alternative method of entry (AMOE) to enter the game. According to another embodiment, the one or more player in the game uses a subscription to enter one or more consecutive games. According to another embodiment, the method further comprises an act of conducting the game over a communication network. According to one embodiment of the invention, the payout to a winning player is predetermined. According to another embodiment, the act of determining a payout to a winning player is determined according to a predetermined payout table.

According to one aspect of the invention, a game is provided including one or more players and involving, for each of the one or more players, a grid of objects wherein each object is chosen from a predetermined set of elements. The game comprises a) providing for randomly selecting one element from a predetermined set of elements, and b) providing for removing the selected element from the grid of objects, wherein acts a) and b) are repeated until a predetermined winning outcome or a predetermined maximum number of repetitions of acts a) and b) is attained. According to one embodiment of the invention, the selected element in act a) is removed by the player from the grid of objects. According to another embodiment, the selected element in act a) is automatically removed by the computer from the grid of objects. According to another embodiment, the game session is conducted without interaction of the at least one player. According to another embodiment, only one of the selected elements by act a) is removed from the grid of objects.

According to another embodiment, some or all of the selected elements by act a) are removed from the grid of objects. According to another embodiment, elements are arranged into predetermined groups in the grid of objects.

According to one embodiment of the invention, the game further comprises an act of c) adding one or more new elements to the grid of objects after performing act b). According to another embodiment, act c) occurs after each occurrence of act b). According to another embodiment, act c) occurs after only predetermined occurrences of act b). According to another embodiment, the predetermined winning outcome is to remove all elements from the grid of objects. According to another embodiment, the predetermined winning outcome is to remove all elements from one or more groups from the grid of objects. According to another embodiment, the one or more players are playing against each other. According to another embodiment, the winning player is the first to attain the predetermined winning outcome. According to another embodiment, each player plays the game to attain the predetermined winning outcome prior to a predetermined maximum number of repetitions of acts a) and b) is attained. According to another embodiment, each player begins the game with the same arrangement of elements in the grid of objects. According to another embodiment, each player begins the game with a different arrangement of elements in the grid of objects.

According to one embodiment of the invention, the elements in each player's grid of objects is randomly determined from a predetermined set of elements by a computer. According to another embodiment, the one or more player in the game uses an alternative method of entry (AMOE) to enter the game. According to another embodiment, the one or more player in the game uses a subscription to enter one or more consecutive games. According to another embodiment, the game further comprises an act of conducting the game over a communication network. According to another embodiment, the payout to a winning player is predetermined. According to another embodiment, the payout to a winning player is made according to a predetermined payout table. According to another embodiment, the predetermined set of elements may include at least one of numbers, letters, shapes, symbols, colors, logos and drawings. According to another embodiment, the player pays to play with at least one of money and loyalty points.

According to one embodiment of the invention, the player pays by at least one of cash, a debit card, a credit card, an account credit, and a loyalty program credit. According to another embodiment, the player is permitted to subscribe to play multiple game sessions. According to another embodiment, the player is permitted to automatically renew the subscription. According to another embodiment, each player plays against the game operator. According to another embodiment, each player does not need to observe the game session to play. According to another embodiment, each player is permitted to observe the game session. According to another embodiment, each player is permitted to observe the game session on at least one of a television, a personal computer, a kiosk, a handheld device, a telephone having a display, and in-person. According to another embodiment, the payout for winning decreases as the number of repetitions of acts a) and b) increases to obtain the predetermined winning outcome. According to another embodiment, the payout for winning to a player is increased with an increased payment by the player to play. According to another embodiment, the payout for winning includes at least one of money, a credit, merchandise, and loyalty points.

According to one embodiment of the invention, the payout for winning money is performed by at least one of cash, a check, a debit card, and an account credit. According to another embodiment, the payout for winning loyalty points is performed by at least one of increasing a loyalty program credit and an account credit. According to another embodiment, the games are run continually. According to another embodiment, after each repetition of acts a) and b), the game further comprises determining whether any of the grid of objects being played attains the predetermined winning outcome, and determining the payout based upon the predetermined payout table. According to another embodiment, the player tells the gaming operator or computer system that the game winning pattern has been matched. According to another embodiment, the player and the winning game card must be verified and authenticated by the gaming operator or computer system. According to another embodiment, a game playing computer system displays to all players when there is a winner. According to another embodiment, a game playing computer system determines player closest to winning.

According to one embodiment of the invention, a game playing computer system displays to all players at least one of the game card and player closest to winning. According to another embodiment, the computer system automatically notifies a player of the game result. According to another embodiment, the computer system automatically notifies a player of winnings. According to another embodiment, the computer system notifies a player by at least one of a group including a telephone, a pager, a fax, a mail message, a television notification, a personal computer message, a handheld device, and a kiosk. According to another embodiment, a player may access his or her results for past gaming sessions remotely at any time. According to another embodiment, the results for past gaming sessions are wins, payouts, or losses. According to another embodiment, a player gains remote access through at least one of a group including a kiosk, a phone, a handheld device, a television and a computer. According to another embodiment, a player gains remote access through at least one of a group including a kiosk, a telephone having a display, a handheld device, a television and a computer.

According to one embodiment of the invention, the game sessions run continually with advertising streams inserted into the display during the game session. According to another embodiment, the game sessions run continually with advertising streams displayed between individual game sessions. According to another embodiment, the selection of the next selected element is visually represented. According to another embodiment, the visual representation is by at least one of a spinning disc, a spinning reel, and a moving pointer. According to another embodiment, the difficulty of the game is adjusted according to the number of players. According to another embodiment, the difficulty of the game increases as the number of players increase. According to another embodiment, the difficulty of the game increases by increasing the number of elements in the predetermined set of elements by predetermined rules. According to another embodiment, the difficulty of the game increases by increasing the number of objects in the grid of objects. According to another embodiment, the difficulty of the game is adjusted according to the number of players. According to another embodiment, the difficulty of the game increases as the number of players increase. According to another embodiment, the difficulty of the game increases by increasing the number of elements in the predetermined set of elements by predetermined rules. According to one embodiment of the invention, the difficulty of the game increases by increasing the number of objects in the grid of objects. According to another embodiment, the difficulty of the game increases by increasing the number of predetermined groups in the grid of objects. According to another embodiment, the difficulty of the game increases by increasing the number of objects in each predetermined group in the grid of objects.

According to one aspect of the invention, a computer system for playing a game is provided. The system comprises means for allowing game players to enter to play a wagering game of chance, means for assigning a group of objects to each player wherein each group of objects is arranged in a pattern that is the same for all players playing in the game session, and the objects of each group of objects are chosen randomly by a gaming operator or computer from a predetermined set of elements, means for choosing a winning outcome for the game session, means for selecting an element from a known set of elements, means for matching the drawn element with the objects in each group of objects, means for determining the winning group of objects, and means for paying out winnings according to a predetermined payout table. According to one embodiment of the invention, a computer system further comprises means for notifying a winning player that he or she has a winning group of objects. According to another embodiment, a computer system further comprises means for notifying a winning player the payout that he or she has won. According to another embodiment, a computer system further comprises means for notifying all game players of one or more winning groups of objects as they occur. According to another embodiment, a computer system further comprises means for notifying all game players of the identity of a winning game player. According to another embodiment, a computer system further comprises means for allowing game players to view the game session proceedings as they occur. According to one embodiment of the invention, a computer system comprises means for allowing game players to review or replay past game sessions. According to another embodiment, a computer system further comprises means for allowing game players to enter using AMOE. According to another embodiment, a computer system further comprises means for allowing game players to pay and to subscribe to one or more game sessions.

According to one aspect of the invention, a computer-readable medium is provided having computer-readable signals stored thereon that define instructions that, as a result of being executed by a computer, instruct the computer to perform a method for conducting a game, the game including one or more players and involving, for each of the one or more players, a group of selectable objects. The method comprises acts of determining, for at least one of the one or more players, the group of objects having a pattern, wherein the act of determining the group of objects further comprises an act of determining the objects, determining, prior to a game session, a winning outcome, selecting elements from a predetermined set of elements, determining if, for the at least one player, whether the outcome of the group of objects matches the predetermined winning outcome, and if so, determining a payout. According to one embodiment of the invention, the act of determining a payout further comprises an act of determining the payout based upon a fixed odds of winning. According to another embodiment, the act of determining the content of the group of objects further comprises automatically choosing at least one portion of the content without the at least one player choosing the at least one portion. According to another embodiment, the game includes a plurality of groups of objects including the at least one group of objects, and the act of determining the at least one group of objects includes an act of ensuring that the content of the at least one group of objects is unique. According to another embodiment, the game session is conducted without interaction of the at least one player. According to another embodiment, the computer-readable medium further comprises an act of providing for an entry of the at least one player in the game using an alternative method of entry (AMOE). According to another embodiment, the act of determining a payout includes an act of determining, from a predetermined payout table, a payout to the at least one player.

According to one aspect of the invention, a method is provided for conducting a game, the game including one or more players and involving, for each of the one or more players, a grid of objects wherein each object is chosen from a predetermined set of elements. The method comprises acts of a) providing for randomly selecting one element from a predetermined set of elements, and b) providing for removing the selected element from the grid of objects, and c) determining a payout to at least one of the one or more players upon reaching a winning outcome for the at least one of the one or more players. According to one embodiment of the invention, the reaching of the winning outcome includes removing all elements from the grid of objects. According to another embodiment, elements are arranged into one or more predetermined groups in the grid of objects, and the reaching of the winning outcome includes removing all elements from at least one of the one or more predetermined groups.

The function and advantage of these and other embodiments of the present invention will be more fully understood from the examples described below. The following examples are intended to illustrate the benefits of the present invention, but do not exemplify the full scope of the invention.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

One aspect of the present invention provides a new game that includes elements of the previously described games of skill and chance known as the "Poppit!" game and the "Bubble-O-Matic" game. According to one aspect of the present invention, it is appreciated that there are advantages of these types of games and similar games that make these games attractive for online gaming. However, according to one aspect of the invention, it is also appreciated that disadvantages of the games "Poppit!" and "Bubble-O-Matic" games include that the games are not wagering games and that the players are not permitted to play against each other.

Thus, according to one aspect of the invention, a player is allowed to play against another player in a "Poppit" or "Bubble-O-Matic"-type game. Further, according to another aspect of the present invention, these aforementioned games of skill and chance are enabled for wagering by a player. In another aspect, upon reaching a particular state of the game (e.g., removing a selected element(s) or set of elements from the interface, or achieving a certain outcome) for one or more of the players, a player wins the game.

Figure 1:
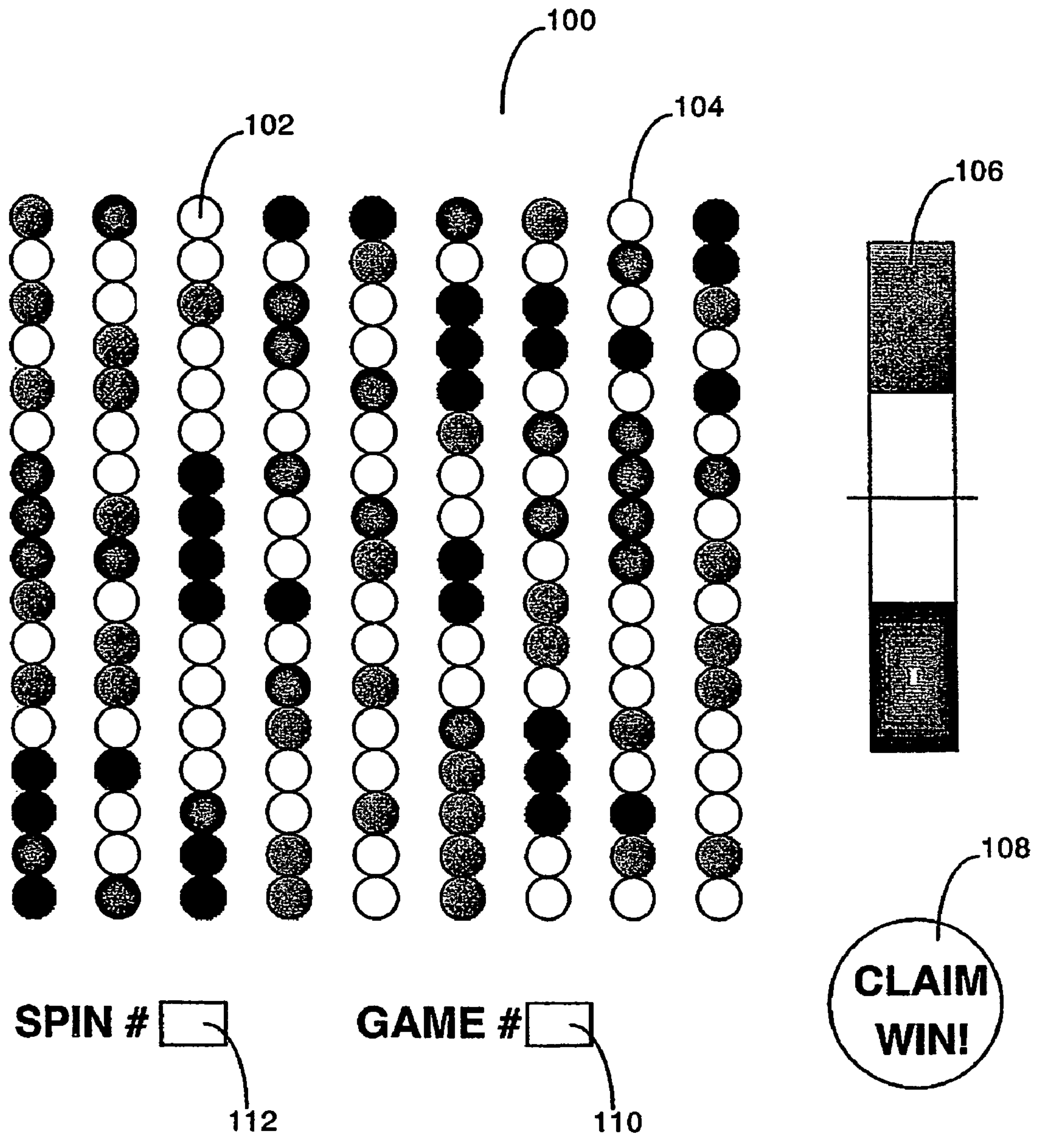
FIG. 1 shows a game interface according to one embodiment of the present invention.

FIG. 1 shows an interface of a game according to one embodiment of the invention. Referring to FIG. 1, a game 100 includes a grid having multiple elements 102. Each element is represented by one of a predetermined set of elements for that game. Elements may include, for example, shapes, object representations such as balloons, bubbles, or spheres, colors, symbols (e.g., integers from 1 to 75, English letters from A to Z, etc.), any combination thereof, or any other type of element. The grid of elements 102 in each game may be subdivided into groups of elements such as the column of elements 104. A group of elements 104 may be a column, row, or specified cluster of elements. It is possible that all players of a game start with the same grid of elements. Preferably, each player is presented a unique grid of elements.

According to one embodiment of the present invention, a game of skill and chance is provided wherein the object of the game of skill and chance is to remove some or all elements on a grid. Preferably, the object of the game is to remove some elements from a group of elements or most preferably, all elements from a group of elements. The winning outcome for a game is predetermined. Elements are removed from the grid when they match the last randomly selected element from the pre-determined set of elements. The same element may be chosen any number of times during a game. In another embodiment, removal of matching elements may be performed by computer. For example, one, some, or all matching elements may be automatically removed by the computer. Preferably, the player selects which matching elements to remove from the grid. A player may have a limited time to make the selections, such as until the next element is selected from the predetermined set of elements. A player may also be limited to choosing only one or some of the elements from his grid of elements for each selected element. Selection of the selected element from the predetermined set of elements may be visually represented, for example, using a spinning reel 106, spinning wheel, or moving pointer.

According to some embodiments, the difficulty to win the game may increase as the number of players increase. The game difficulty may increase in numerous ways including increasing the number of elements in the predetermined set of elements, increasing the number of group of elements, or increasing the number of elements in a group of elements. The number of players may be determined at the beginning of the game, and thus the difficulty of the game may be determined at the beginning of a game. Alternatively, the number of players may be monitored as players are added and subtracted, and the difficulty of the game may be adjusted as the game proceeds in response to the number of players. In this case, a predetermined set of rules for adjusting game parameters while the game is in progress may be associated with the game. The parameters adjusted may include, for example, the number of elements in the predetermined set of elements or the number of objects in each group of objects within the grid of objects.

According to one embodiment, new elements may be added to a player's grid of elements prior to selecting the next element from the predetermined set of elements. Elements may be added following predetermined rules. An example of such a rule includes adding one random new element to each group of elements that has less than the initial number of elements in the group.

According to another embodiment, a game may finish before a winner is obtained. For example, a game may have a predetermined maximum number of element selections that may occur. To aid a player in keeping track of the number of elements selected during a game, the number of selected elements during a game may be represented to the player, such as the number of spins 112 in FIG. 1.

According to one embodiment of the invention, a game player may need to pay for playing prior to a game. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The game player may pay in person using a cashier (e.g. at a casino or a lottery outlet) or through other remote means including telephone, handheld device, kiosk, computer through the internet or other network and mail.

In one embodiment of the invention, players may subscribe to play multiple consecutive games. That is, the player pays at one time to play many consecutive games. The player may also choose to have his or her subscription automatically renewed.

According to one embodiment of the invention, players may also enter to play this or any other wagering game of skill or chance using an alternative method of entry (AMOE). AMOE is a required available method of entry that does not require a purchase to enter a sweepstake; sweepstakes are usually used as a promotional or marketing tool. An individual entering a sweepstakes by AMOE is required by law to have the same odds of winning each of the available prizes.

A common AMOE method is to have an individual interested in entering the sweepstakes send in a post card with his or her name, address or other contact information. Another AMOE method is to have an individual sign on to a free internet website and submit the required information for free. Numerous other methods may be used for AMOE. Most sweepstakes limit the number of times one individual or family may enter a sweepstakes by AMOE.

According to one embodiment of the invention, it is realized that an AMOE (alternative method of entry) may be used to enter a game of skill or chance. More particularly, it is possible to develop, implement and run wagering games of skill or chance, including the inventive games described herein, with an AMOE method of entry as is usually associated with sweepstakes. An individual may enter the wagering game of chance by AMOE using the post card or the online method outlined above. The wagering game of skill or chance player entering by AMOE may also have the same odds to win the payout associated with the game in which they are entered. The wagering game of chance player entering by AMOE may also be limited to a small number of games within a given period of time, for example one game in one year or two games in one month. Other numbers of games and given periods may be any number, and the invention is not limited to any particular implementation.

According to one embodiment, the game that the game player entering by AMOE is entered into may be determined by the game player on the AMOE entry form. For example, the post card AMOE may be required to state the date and the time of the game that the game player wants to enter. Alternatively, the game entered may be the next starting game after the AMOE is received and logged. As another alternative, AMOE entries may be assigned to a specific game(s) each hour, day, week or other time interval.

According to one embodiment, a game also has a predetermined payout table associated with it. The payout table may have a listing of the ways to obtain a payout and its payout amount. The payout amount for a win may depend upon but may not be rigidly determined by the odds of obtaining the predetermined winning outcome in the predetermined maximum number of selected elements; for example, the odds of obtaining the predetermined winning outcome with ten selected elements may be twice that for twenty winning cell content drawn, but the payout may be only one and one half times higher for matching the winning pattern in ten versus twenty selected elements. Thus, the payout amount may be varied, preferably increased, if the predetermined winning outcome was obtained in less than the predetermined maximum number of selected elements. For example, if the predetermined maximum number of selected elements is twenty and the payout for that is thirty credits, then if the winning outcome is obtained within the first ten drawn selected elements then the payout for obtaining that may be forty-five credits.

The payout table may also have adjustments for a player's subscription. For instance, the payout may increase if the player has a multiple game subscription, multiple card subscription, high payment per game or any combination of the three. The payout may also be adjusted for numerous other criterion including frequent player credits. Of course, all payout adjustments must meet any legal requirements for the gaming jurisdiction in which the game is played.

The payout table for each game session may also be supplemented by a jackpot that transfers from game session to game session. These types of jackpots are commonly called rolling or progressive jackpots. A rolling jackpot may be the same amount that transfers from game session to game session until it is paid out. A progressive jackpot is a rolling jackpot that increases as additional games are played. Rolling or progressive jackpots are typically paid out for a difficult way to obtain the predetermined winning outcome, e.g. completely remove a group of elements within five selected elements.

The final payout may also be affected as to whether the game has a fixed payout for a win or whether the payout is shared. If the payout is fixed for a win, all players that obtain the predetermined winning outcome at the same time will be paid the amount listed in the payout table for the win; in this instance, each player is playing solely against the game operator. If the payout is shared, then all players that obtain the predetermined winning outcome at the same time will be paid a total of the amount listed in the payout table. Each player may receive a share of the total payout depending upon how much he or she paid for the game or any other legal criteria.

The final payout may also be affected by bonus play. Bonus play is well known in the gaming industry and works to increase some payouts by offering the chance to multiply a payout.

One or more games may proceed concurrently. Parameters of the concurrent games may be the same, similar, or different. For example, the randomly selected elements from the predetermined set of elements may be used for one or more concurrent games if the predetermined set of elements is the same for the one or more concurrent games. As a further example, the parameter of the grid of elements may be different in all the games.

Additionally, the games may run continually, i.e. one after another. When one game ends, another game will begin immediately or in a short period of time. The games may follow a precise time schedule so that players know when games begin. If game play requires four and a half (4.5) minutes to complete, then the next game may start immediately or in thirty seconds to keep to a schedule of games every five minutes at :00, :05, :10, :15, :20, :25, :30, :35, :40, :45, :50, :55 of each hour. Since the games may run continually, it may be possible that a game will have no game player playing.

A computer system may automatically choose the grid of elements for a game player. Because a computer system can both choose the grid of elements and play the game, a player need not participate or observe each game, as discussed further below.

The game player may view the game proceedings using television, wireless or line telephone with display, handheld device, kiosk, computer or in person; depending upon the viewing medium, it may be necessary to download game information prior to viewing while other viewing medium may allow viewing of the streamed game information. For example, the game player may operate a computer system that has an Internet-enabled interface (e.g., using Macromedia Flash or Java) and the computer system may display streamed game information within that interface.

When the player obtains the predetermined winning outcome, he or she then informs the game operator that they have a winner. If the game player is playing the game remotely, for instance over the web or interactive television, or if the game operator is a computer system, then an electronic or voice indication method would be necessary to authenticate and verify the game player and the winning game card. Such methods are well known in the remote and electronic gaming industry. As an example, a player may click on a "Claim Win!" button 108 as shown in FIG. 1.

According to one embodiment, a computer system may automatically remove the matching elements on a grid of elements after a selected element is chosen from the predetermined set of elements. The game player may view the game proceedings using television, wireless or other telephone with display, handheld device, kiosk or computer; the game player may also decide not to watch. The computer system may then automatically determine when a player is a winner; such a result is automatically authenticated and verified by the computer system. In this instance, the computer system may then notify the game player that he or she has won and what the winnings are after the computer has consulted the predetermined payout table described above; the computer may also determine if the winning needs to be shared with other players. The notification of winning to a game player may occur by mail, e-mail, computer web or network, telephone, television, pager, fax, kiosk or any other possible method.

When the computer system is automatically removing the matching elements on a grid of elements, the computer system may also determine the grid of elements and the associated player identity(ies) that is closest to winning after each selected element. The computer system may then display the grid of elements or the identity of the game player(s) closest to winning to all game players observing the game. The computer system may also choose to display only one or a subset of all the grids of elements or identities of players closest to winning to a particular game player observing the game.

When a winner is authenticated and verified, the computer system may then notify all game players observing the session that a win has occurred. Additionally, the computer system may display the winning player's identity or the payout. Since the game session may not end until a predetermined maximum number of selected elements are drawn, it is possible for this notification to occur several times, each time for a different player, during a game.

During the period of time between the games, a game operator may make announcements, rest, or any number of actions. If the game is played using a computer system, then advertisements, sponsorships, public service announcements or any visual or auditory content may be inserted. The advertisements, etc. may also be inserted into the game display during a game.

When the computer automatically removes the matching elements on the grid of elements for the players, a game player may access information about the results of a game remotely after the game is completed. Remote access may be gained by kiosk, telephone, television, computer, handheld device or any other device or system that is appropriate. Information that may be accessed about a past game may include whether the player won or lost or what the player's payout was.

Preferably, the game and the game play are partially or fully automated using one or more computer systems. More preferably, the game and the game play are fully automated. A computer system may be a single computer that may be a supercomputer, minicomputer or a mainframe or personal computer. A computer system may also be any multiple and combination of computer types that work together; multiple computer systems may also be needed to run the whole game. The computer system also may include input or output devices, displays, or storage units.

Figure 3:
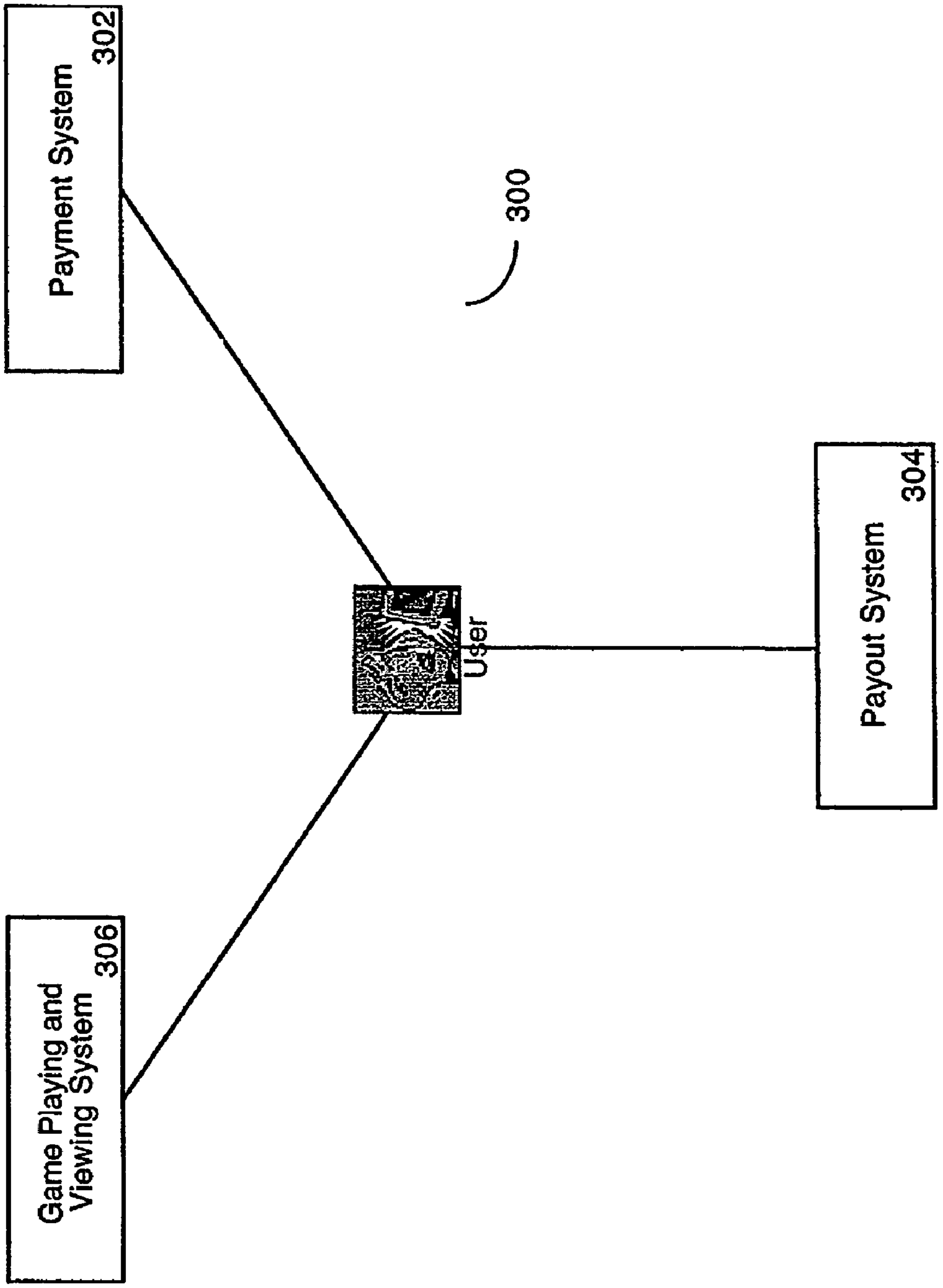
FIG. 3 shows components of a game computer system according to one embodiment of the present invention.
Figure 4:
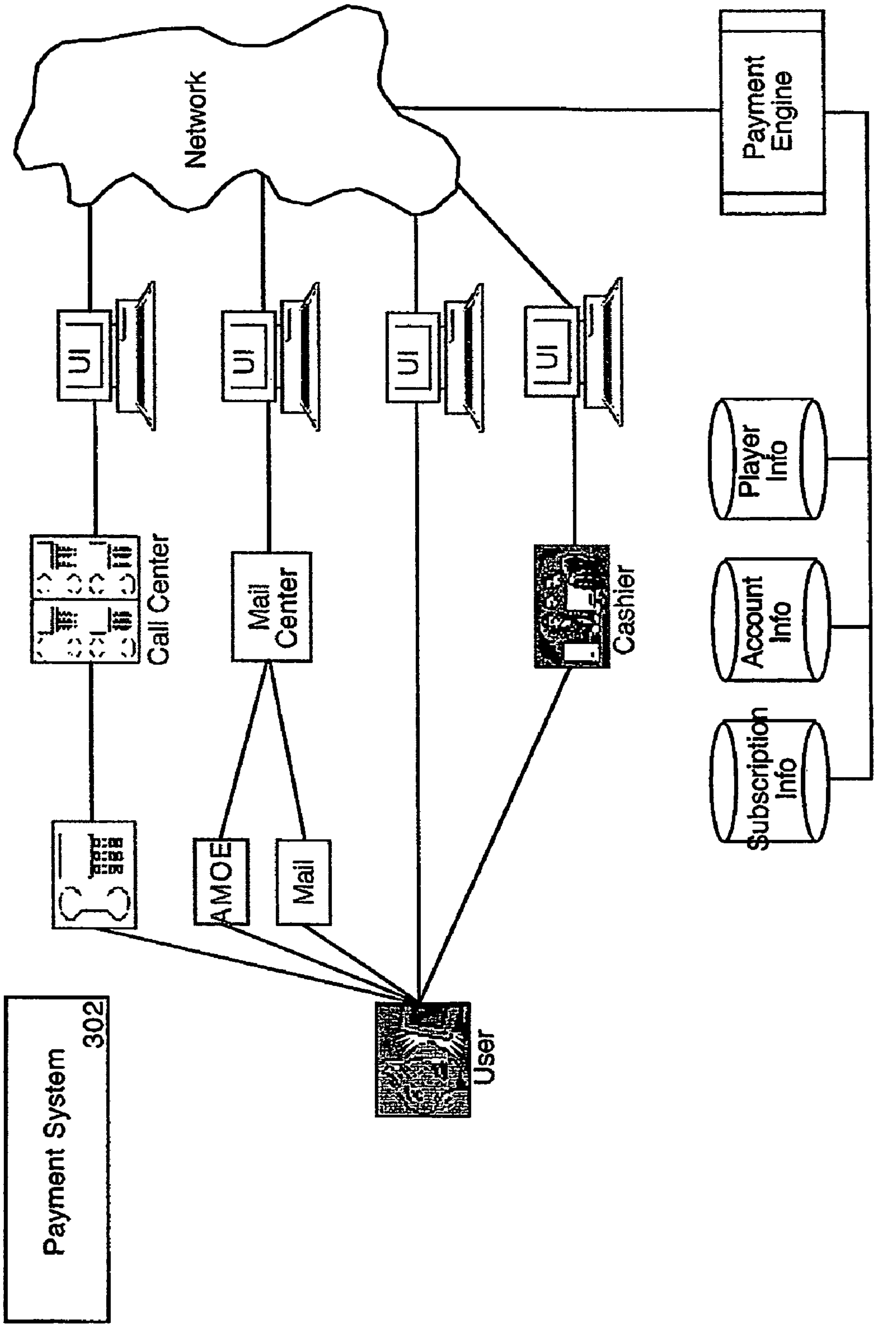
FIG. 4 shows components of a game payment subsystem according to one embodiment of the present invention.
Figure 5:
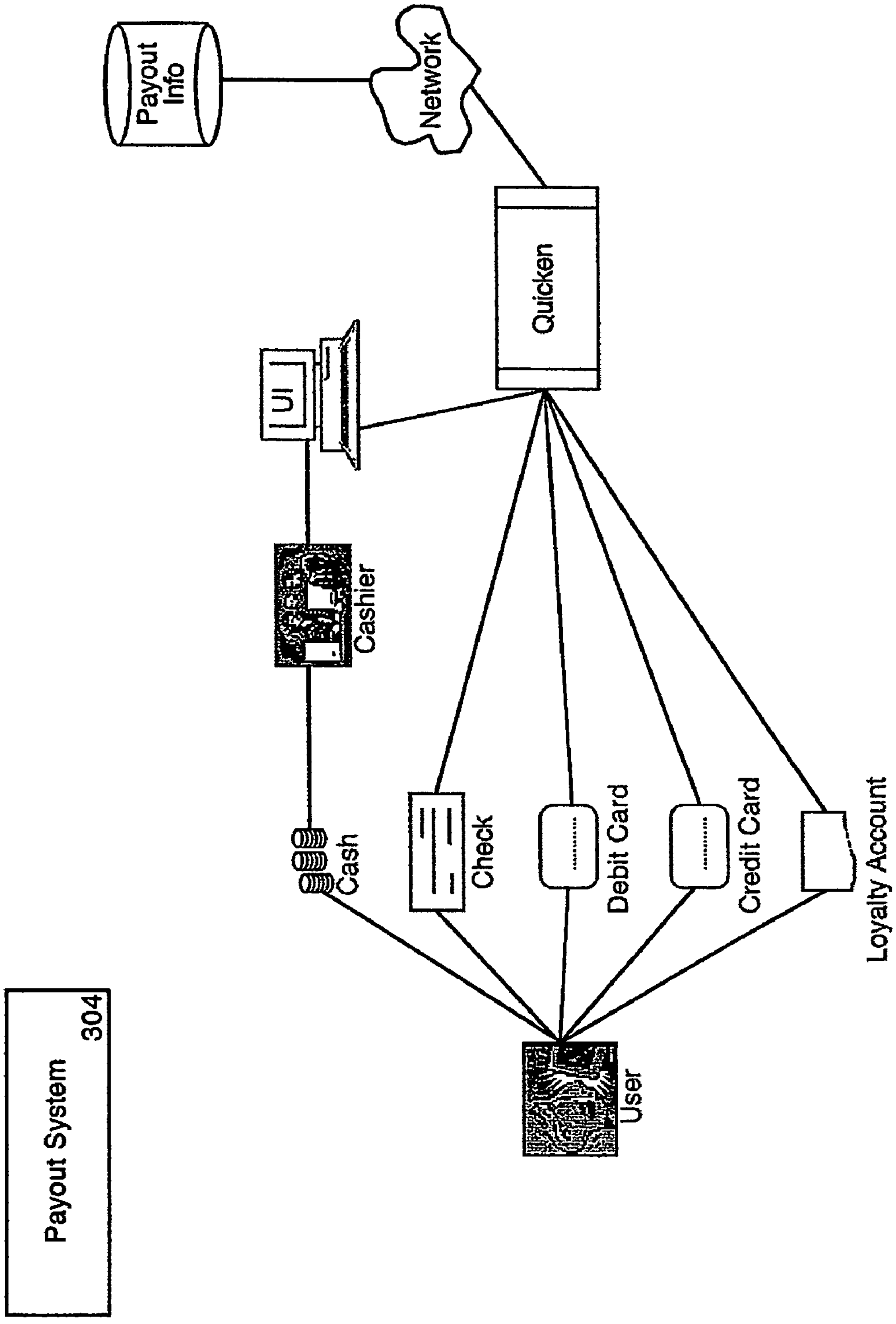
FIG. 5 shows components of a game payout subsystem according to one embodiment of the present invention.
Figure 6:
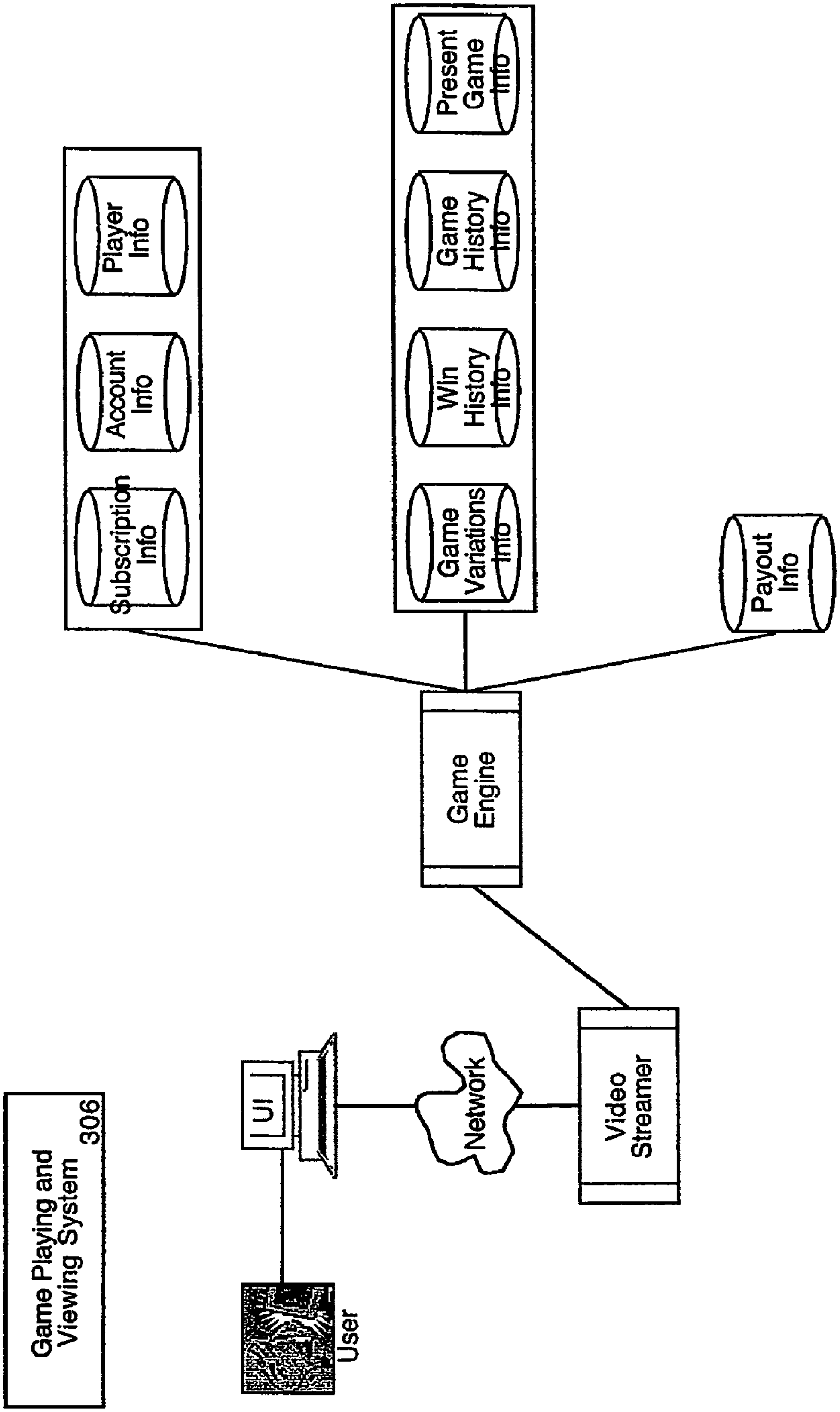
FIG. 6 shows components of a game playing and viewing subsystem according to one embodiment of the present invention.

A computer system to run the described game may have three component systems, as shown in FIG. 3. One system 302 may handle payment, subscription and/or AMOE by players to enter the game. Another system 306 may handle playing and viewing the game and the third system 304 may handle payouts. The game system may also be connected by direct line or network to other computer systems including systems for handling casino or hotel loyalty programs, reservations, in-room television viewing or gambling floor kiosks. Connections to other computer systems may be performed using one or more of the system components described below.

The payment system may be one or many of a number of well-known systems. For example, a player may be able to pay using a telephone and talking with a call center representative that inputs player, payment and subscription information into a computer data structure using a user interface. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interfaces (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

The player information that may be input includes name, address, telephone number and age. Payment information may include credit or debit card number or loyalty account information. Subscription information may include first game session date and time, number of games to play and bet per game. Based upon the payment and subscription information, the call center representative would then verify that the payment information is valid and enough credit or funds is available for the player's desired subscription.

A similar system may exist for players entering using the mail or a post card AMOE except the call center may be replaced by a mail center with representatives entering information into a data structure using a user interface. A cashier, for example at a casino for players to pay cash to play, may also have the ability to input player, account and subscription information using a user interface.

Computer systems or pay engines for handling electronic or online payment and subscriptions may also be used. Such systems are well known including PayPal, iKobo, Verisign, and other systems. Using such a system, a player interacts directly with the user interface to input information into the payment data structure that may be transferred to one or more payment systems (e.g., PayPal).

All the various pay systems and the various user interfaces may be on a network with the computer system(s) containing the player, account and subscription database(s). As used herein, a "network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above are merely an illustrative embodiment of the pay system. Such an illustrative embodiment is not intended to limit the scope of the invention, as any of numerous other implementations of the pay system, for example, variations of online payment, are possible and are intended to fall within the scope of the invention. For example, the payment system may include using pay-per-view systems associated with interactive television or the pay engine may additionally deliver a receipt to the player by either e-mail or mail. None of the claims set forth below are intended to be limited to any particular implementation of the pay system unless such claim includes a limitation explicitly reciting a particular implementation.

Payout systems are also well known. Any of a number of standard systems or payout engines for making payouts for winning may be used. For example, a standard application programming interface such as 'Quicken' (Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

The game playing and viewing system may comprise of a number of components for performing specific functions. The components may include storage means for data structures for storing game variations, present game information, game history and win history and components to access the payment and payout data structures.

The data structure of a game may include several embodiments. A game may have a number of predetermined items including game date and time, game length, predetermined payout table, payout type, grid of element shape, size, and grouping, predetermined winning outcome, predetermined set of elements and the predetermined maximum number of elements to be selected as well as who the players are and the exact grid of elements assigned to each.

From the predetermined maximum number elements to be selected and the set of elements, a game has the selected elements drawn by hand or by the computer system and may keep the specific draw order of the selected elements for later reference. The game also may have an associated winner(s); it is possible a game may have no winners.

Figure 2:
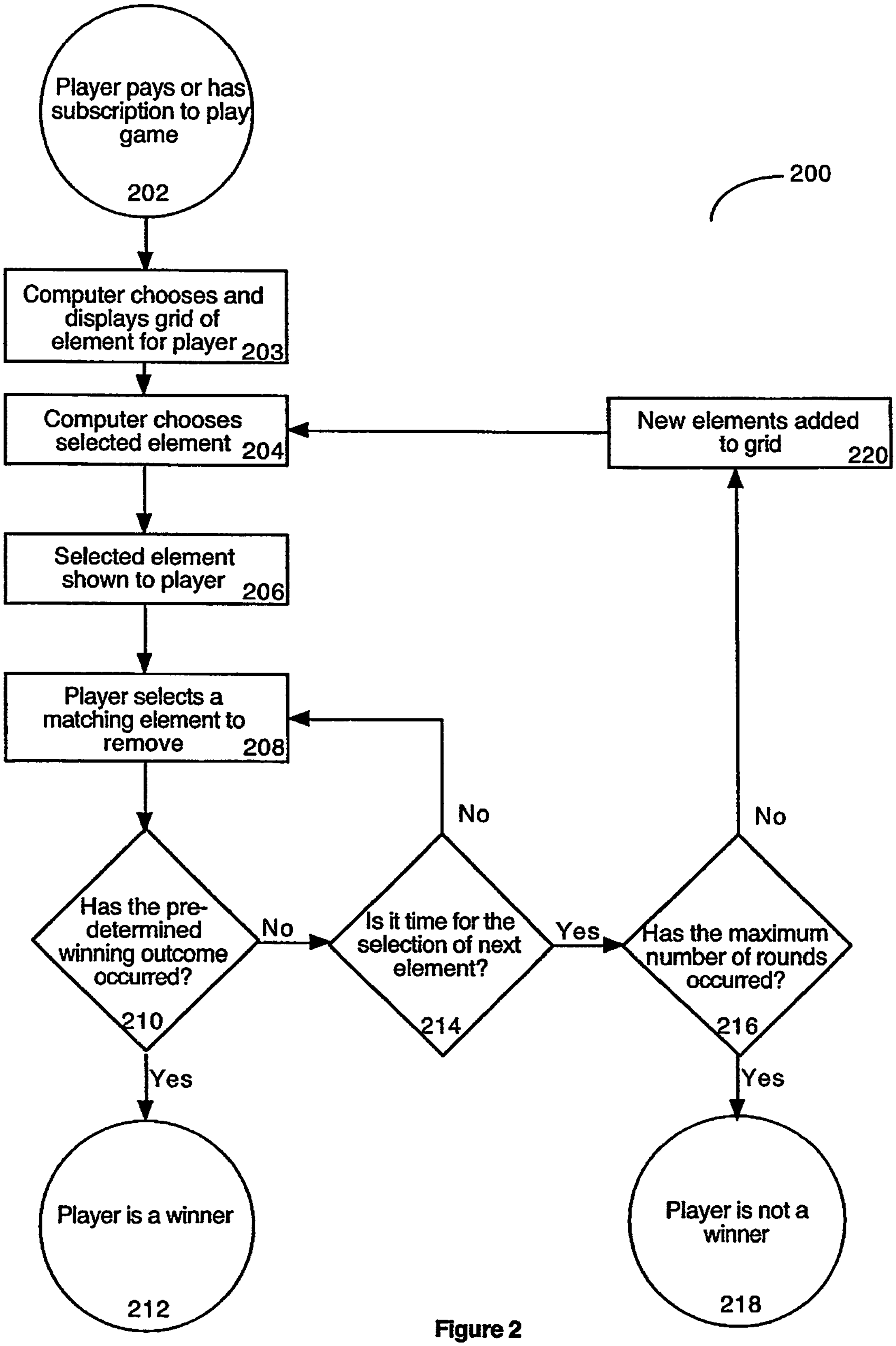
FIG. 2 shows a flow chart a computer system may follow for playing a game according to one embodiment of the present invention.

The game playing and viewing system would also have a game engine. The game engine may perform functions according to process 200 as shown in FIG. 2. Using FIG. 2 as a guide, a game may proceed as such for a player with a grid of elements. At step 202, the player pays or subscribes to play a game. At 203, the computer selects and displays a grid of elements for the player. Next at 204, the computer draws the first selected element and at 206 shows the selected element to the player. The player then selects a matching element on the grid of elements to remove, if necessary (208). If the player obtains the predetermined winning outcome at 210, then the player is a winner; if not, then the player continues to select matching elements until either he or she wins or time has expired to select matching elements at 214. When time has expired for the player to select and remove matching elements, the computer determines if the maximum number of selected elements has been attained. If yes, then the player is not a winner; if no, then new elements are added to the grid of elements at 220, if appropriate. The computer would then return to 204 and choose the next selected element.

If the player is a winner at 212, then the computer may proceed to notify the player that he or she is a winner as well as possibly determine the payout and notify the player also of such. The computer may also display the winning player information to all the game players. Winning player information that may be displayed includes name, city, state and country. If multiple winners occur simultaneously, all winners may be displayed at one time or sequentially. It may also be possible that winners may be selectively displayed to game players. For instance if numerous winners occur at one time, a player in Bismarck, N.Dak. may be shown only the winning player information that occurred closest to him or her, say in Pierre, S.Dak. versus some other location (e.g., Boston, Mass.).

After a player is found not to be a winner, the computer may also determine whether the player is the closest to winning if there have been no winners. Any of a number of criteria may be used for determining the player closest to winning. For example, a computer may determine that a player is the closest to winning based upon having the least number of elements left in a group or grid or the least number of colors left in a group or grid. A grid determined to be closest to winning may then be displayed to all game players.

The game play process 200 may include additional acts. Further, the order of the acts performed as part of process 200 is not limited to the order illustrated in FIG. 2 as the acts may be performed in other orders, and one or more of the acts of process 200 may be performed in series or in parallel to one or more other acts, or parts thereof. For example, acts 203 and 204, or parts thereof, may be performed in parallel, and act 220 may be performed at any point during performance of process 200.

Process 200 is merely an illustrative embodiment of the method of game play for a game engine. Such an illustrative embodiment is not intended to limit the scope of the invention, as any of numerous other implementations of the method of game play for a game engine. For example, variations of process 200 are possible and are intended to fall within the scope of the invention. None of the claims set forth below are intended to be limited to any particular implementation of the method of game play for a game engine, unless such claim includes a limitation explicitly reciting a particular implementation.

Process 200, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 7, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite or wireless medium to a user interface. If the game is played completely automatically, the user interface may be merely a video terminal including television with no user input means. Viewing access may be controlled by standard means for conditional access including using set top box addresses, telephone numbers or internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout and game engines, may be implemented using software (e.g., C, C#, C++, Java, or a combination thereof), hardware (e.g., one or more application-specific integrated circuits), firmware (e.g., electrically-programmed memory) or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 7 and 8.

System 300 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game selection, generation of a player's grid of elements, choosing selected elements, removing matching elements, determining winners and paying winners. It should be appreciated that the system may perform other functions, including network communication, and the invention is not limited to having any particular function or set of functions.

Figure 7:
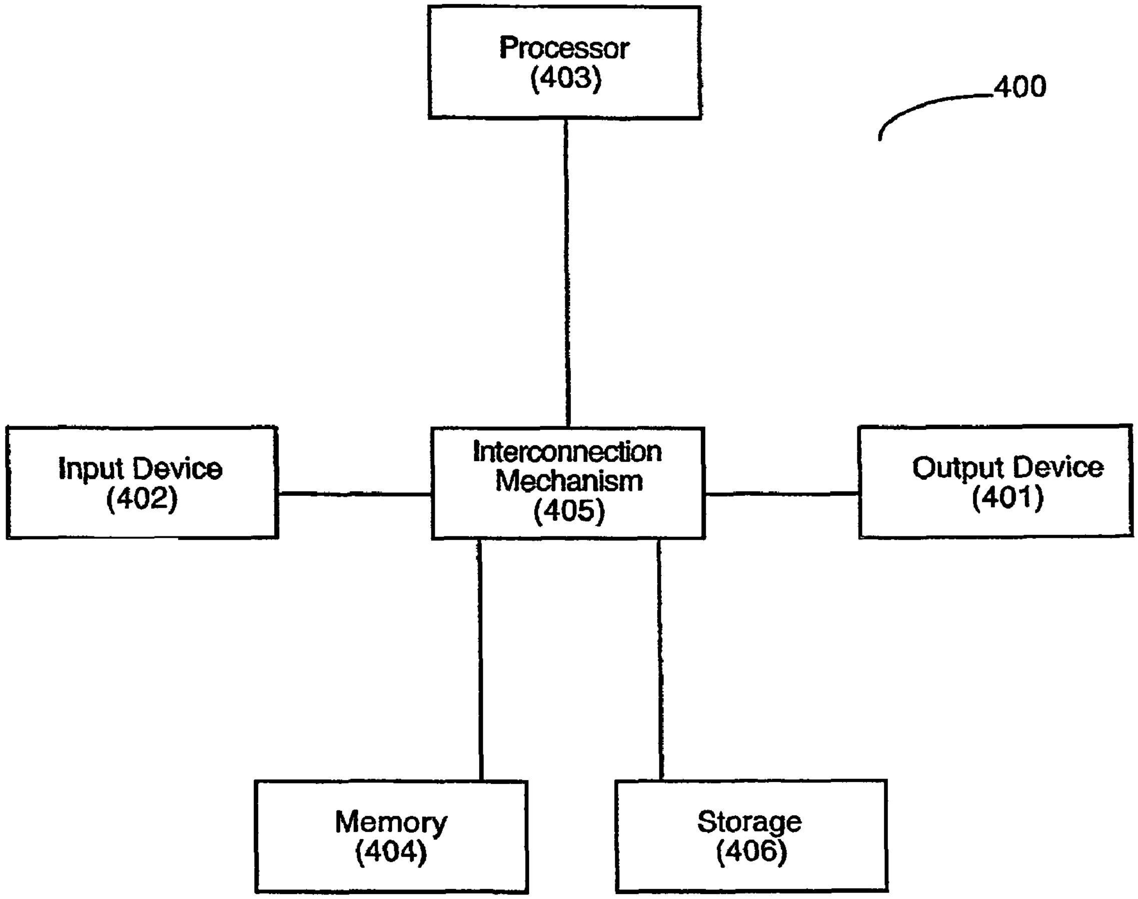
FIG. 7 shows a general-purpose computer system upon which various embodiments of the present invention may be practiced.

For example, various aspects of the invention may be implemented as specialized software executing in a general-purpose computer system 400 such as that shown in FIG. 7. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 8:
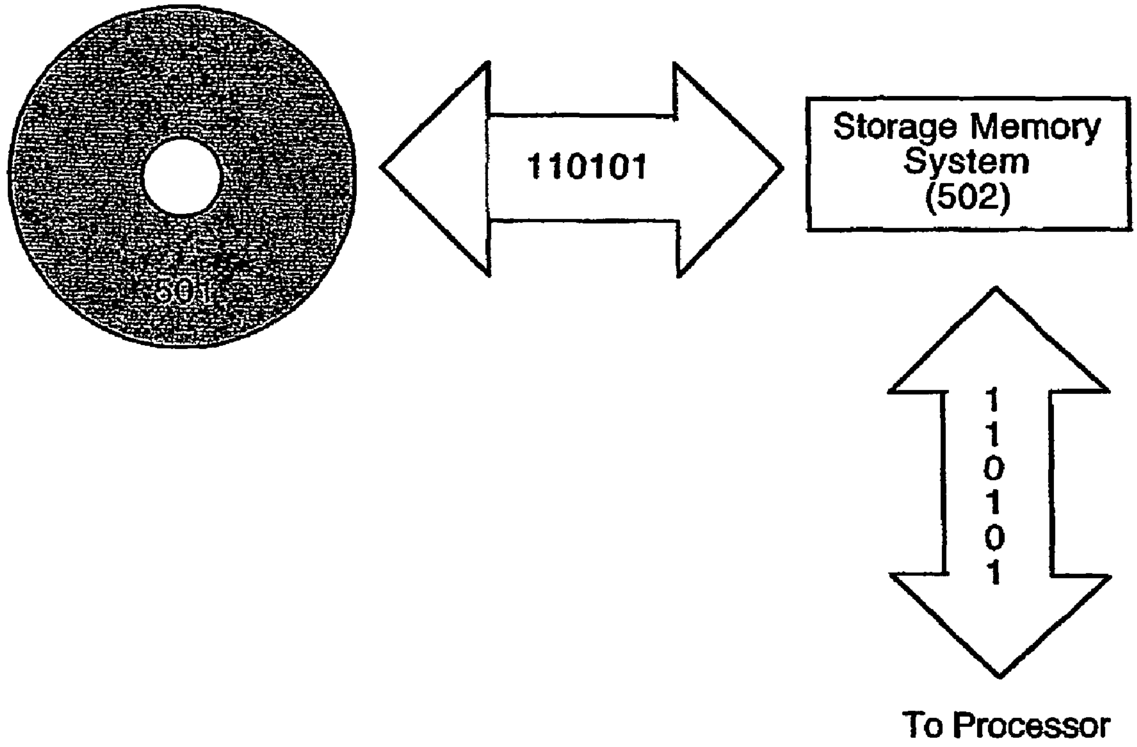
FIG. 8 shows a computer data storage system with which various embodiments of the present invention may be practiced.

The storage system 406, shown in greater detail in FIG. 8, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 7.

Various aspects of the invention may be practiced on one or more computers having a different architecture or components that that shown in FIG. 7.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for conducting a game, the method comprising:

a) providing a game including a plurality of players and involving, for each of the plurality of players, a grid of objects wherein each object is chosen from a predetermined set of elements;

b) providing for randomly selecting one element from a predetermined set of elements; and c) providing for removing at least one object from the grid of objects when the selected element matches at least one object in the grid of objects such that the selected element determines the at least one object removed from the grid of objects, wherein acts b) and c) are repeated until a predetermined winning outcome is attained, which is to remove all objects from the grid of objects, wherein the element selected in act b) is automatically removed by a computer from the grid of objects, and wherein the game is conducted without interaction of a player subsequent to the player subscribing to play the game.

2. The method according to claim 1, wherein only one element selected in act b) is removed from the grid of objects.

3. The method according to claim 1, wherein a plurality of elements are selected in act b) and are removed from the grid of objects.

4. The method according to claim 1, wherein objects are arranged into one or more predetermined groups in the grid of objects.

5. A method according to claim 4, wherein the predetermined winning outcome is to remove all objects from one or more of the predetermined groups in the grid of objects.

6. The method according to claim 1, further comprising an act of d) adding one or more new elements to the grid of objects after performing act c).

7. The method according to claim 6, wherein act d) occurs after each occurrence of act c).

8. A method according to claim 6, wherein act d) occurs after only predetermined occurrences of act c).

9. A method according to claim 1, wherein at least two players are permitted to play against each other.

10. A method according to claim 9, wherein a winning player is the first to attain the predetermined winning outcome.

11. A method according to claim 1, wherein each player plays the game to attain the predetermined winning outcome prior to a predetermined maximum number of repetitions of acts b) and c).

12. A method according to claim 1, wherein each player begins the game with a same arrangement of objects in the grid of objects.

13. A method according to claim 1, wherein each player begins the game with a different arrangement of objects in the grid of objects.

14. A method according to claim 1, wherein the objects in each player's grid of objects are randomly determined from a predetermined set of elements by a computer.

15. The method according to claim 1, wherein the one or more of the plurality of players in the game uses an alternative method of entry (AMOE) to enter the game, the AMOE comprising at least one of submitting a post card, submitting an entry form, or submitting information through a web site.

16. The method according to claim 1, wherein one or more of the plurality of players in the game use a subscription to enter one or more consecutive games.

17. The method according to claim 1, further comprising an act of conducting the game over a communication network.

18. The method according to claim 1, wherein a payout to a winning player is predetermined.

19. The method according to claim 1, wherein an act of determining a payout to a winning player is determined according to a predetermined payout table.

20. A non-transitory computer readable medium for playing a game of chance comprising:

a) providing, via a processor, for each of a plurality of players, a grid of objects wherein each object is chosen from a predetermined set of elements;

b) providing, via the processor, for randomly selecting one element from a predetermined set of elements; and c) providing, via the processor, for removing at least one object from the grid of objects when the selected element matches at least one object in the grid of objects such that the selected element determines the at least one object removed from the grid of objects, wherein acts b) and c) are repeated until a predetermined winning outcome is attained, which is to remove all elements from the grid of objects, wherein the element selected in act b) is automatically removed by a computer from the grid of objects, and wherein the game is conducted without interaction of a player subsequent to the player subscribing to play the game.

21. The non-transitory computer readable medium for playing a game of chance according to claim 20, wherein only one element selected in act b) is removed from the grid of objects.

22. The non-transitory computer readable medium for playing a game of chance according to claim 20, wherein a plurality of elements are selected in act b) and are removed from the grid of objects.

23. The non-transitory computer readable medium for playing a game of chance according to claim 20, wherein objects are arranged into predetermined groups in the grid of objects.

24. The non-transitory computer readable medium for playing a game of chance according to claim 23, wherein the predetermined winning outcome is to remove all elements from one or more groups in the grid of objects.

25. The non-transitory computer readable medium for playing a game of chance according to claim 20, further comprising an act of d) adding one or more new objects to the grid of objects after performing act c).

26. The non-transitory computer readable medium for playing a game of chance according to claim 25, wherein act d) occurs after each occurrence of act c).

27. The non-transitory computer readable medium for playing a game of chance according to claim 25, wherein act d) occurs after only predetermined occurrences of act c).

28. The non-transitory computer readable medium for playing a game of chance according to claim 20, wherein at least two of the plurality of players play against each other.

29. The non-transitory computer readable medium for playing a game of chance according to claim 28, wherein a winning player is the first to attain the predetermined winning outcome.

30. The non-transitory computer readable medium for playing a game of chance according to claim 20, wherein each player plays the game to attain the predetermined winning outcome prior to a predetermined maximum number of repetitions of acts b) and c).

31. The non-transitory computer readable medium for playing a game of chance according to claim 20, wherein each player begins the game with the same arrangement of objects in the grid of objects.

32. The non-transitory computer readable medium for playing a game of chance according to claim 20, wherein each player begins the game with a different arrangement of objects in the grid of objects.

33. The non-transitory computer readable medium for playing a game of chance according to claim 20, wherein the elements in each player's grid of objects is randomly determined from a predetermined set of elements by a computer.

34. The non-transitory computer readable medium for playing a game of chance according to claim 20, wherein the one or more players in the game use an alternative method of entry (AMOE) to enter the game, the AMOE comprising at least one of submitting a post card, submitting an entry form, or submitting information through a web site.

35. The non-transitory computer readable medium for playing a game of chance according to claim 20, wherein at least one of the plurality of players in the game uses a subscription to enter one or more consecutive games.

36. The non-transitory computer readable medium for playing a game of chance according to claim 20, further comprising an act of conducting the game over a communication network.

37. The non-transitory computer readable medium for playing a game of chance according to claim 20, wherein a payout to a winning player is predetermined.

38. The non-transitory computer readable medium for playing a game of chance according to claim 20, wherein a payout to a winning player is made according to a predetermined payout table.

39. The non-transitory computer readable medium for playing a game of chance according to claim 20, wherein the predetermined set of elements comprises at least one of numbers, letters, shapes, symbols, colors, logos or drawings.

40. The non-transitory computer readable medium for playing a game of chance according to claim 20, wherein a player pays to play with at least one of money or loyalty points.

41. The non-transitory computer readable medium for playing a game of chance according to claim 20, wherein a player pays by at least one of cash, a debit card, a credit card, an account credit, or a loyalty program credit.

42. The non-transitory computer readable medium for playing a game of chance according to claim 20, wherein a player is permitted to subscribe to play multiple games.

43. The non-transitory computer readable medium for playing a game of chance according to claim 42, wherein the player is permitted to automatically renew the subscription.

44. The non-transitory computer readable medium for playing a game of chance according to claim 20, wherein each player plays against the game operator.

45. The non-transitory computer readable medium for playing a game of chance according to claim 20, wherein each player does not need to observe the game to play.

46. The non-transitory computer readable medium for playing a game of chance according to claim 20, wherein each player is permitted to observe the game.

47. The non-transitory computer readable medium for playing a game of chance according to claim 46, wherein each player is permitted to observe the game on at least one of a television, a personal computer, a kiosk, a handheld device, a telephone having a display, or in-person.

48. The non-transitory computer readable medium for playing a game of chance according to claim 47, wherein a payout for winning decreases as the number of repetitions of acts b) and c) increases to obtain the predetermined winning outcome.

49. The non-transitory computer readable medium for playing a game of chance according to claim 20, wherein a payout for winning to a player is increased with an increased payment by the player to play.

50. The non-transitory computer readable medium for playing a game of chance according to claim 20, wherein a payout for winning includes at least one of money, a credit, merchandise, or loyalty points.

51. The non-transitory computer readable medium for playing a game of chance according to claim 20, wherein a payout for winning money is performed by at least one of cash, a check, a debit card, or an account credit.

52. The non-transitory computer readable medium for playing a game of chance according to claim 20, wherein a payout for winning loyalty points is performed by at least one of increasing a loyalty program credit or an account credit.

53. The non-transitory computer readable medium for playing a game of chance according to claim 20, wherein games are run continually.

54. The non-transitory computer readable medium for playing a game of chance according to claim 20, wherein after each repetition of acts b) and c), the game further comprises:

determining, via the processor, whether any grid of objects being played attains the predetermined winning outcome; and determining, via the processor, a payout based upon a predetermined payout table.

55. The non-transitory computer readable medium for playing a game of chance according to claim 54, wherein a game playing computer system displays to all players when there is a winner.

56. The non-transitory computer readable medium for playing a game of chance according to claim 54, wherein a game playing computer system determines a player closest to winning.

57. The non-transitory computer readable medium for playing a game of chance according to claim 56, wherein a game playing computer system displays to all players at least one of a game card or the player closest to winning.

58. The non-transitory computer readable medium for playing a game of chance according to claim 54, wherein a computer system automatically notifies a player of the game result.

59. The non-transitory computer readable medium for playing a game of chance according to claim 58, wherein the computer system notifies a player by at least one of a group including a telephone, a pager, a fax, a mail message, a television notification, a personal computer message, a handheld device, and a kiosk.

60. The non-transitory computer readable medium for playing a game of chance according to claim 54, wherein a computer system automatically notifies a player of winnings.

61. The non-transitory computer readable medium for playing a game of chance according to claim 54, wherein a player may access his or her results for past gaming sessions remotely at any time.

62. The non-transitory computer readable medium for playing a game of chance according to claim 61, wherein the results for past gaming sessions are wins, payouts, or losses.

63. The non-transitory computer readable medium for playing a game of chance according to claim 61, wherein a player gains remote access through at least one of a group including a handheld device and a computer.

64. The non-transitory computer readable medium for playing a game of chance according to claim 61, wherein a player gains remote access through at least one of a group including a kiosk, a telephone, and a television.

65. The non-transitory computer readable medium for playing a game of chance according to claim 20, wherein a player tells at least one of a gaming operator or computer system that a game winning pattern has been matched.

66. The non-transitory computer readable medium for playing a game of chance according to claim 65, wherein the player and a winning game card must be verified and authenticated by the gaming operator or computer system.

67. The non-transitory computer readable medium for playing a game of chance according to claim 20, wherein games run continually with advertising streams inserted into a display during the game.

68. The non-transitory computer readable medium for playing a game of chance according to claim 20, wherein games run continually with advertising streams displayed between individual games.

69. The non-transitory computer readable medium for playing a game of chance according to claim 20, wherein the selection of a next selected element is visually represented.

70. The non-transitory computer readable medium for playing a game of chance according to claim 69, wherein the visual representation is by at least one of a spinning disc, a spinning reel, or a moving pointer.

71. The non-transitory computer readable medium for playing a game of chance according to claim 20, wherein a difficulty of the game is adjusted according to a number of players.

72. The non-transitory computer readable medium for playing a game of chance according to claim 71, wherein the difficulty of the game increases as the number of players increases.

73. The non-transitory computer readable medium for playing a game of chance according to claim 72, wherein the difficulty of the game increases by increasing the number of elements in the predetermined set of elements by predetermined rules.

74. The non-transitory computer readable medium for playing a game of chance according to claim 72, wherein the difficulty of the game increases by increasing the number of objects in the grid of objects.

75. The non-transitory computer readable medium for playing a game of chance according to claim 20, wherein a difficulty of the game is adjusted according to a number of players.

76. The non-transitory computer readable medium for playing a game of chance according to claim 75, wherein the difficulty of the game increases as the number of players increases.

77. The non-transitory computer readable medium for playing a game of chance according to claim 76, wherein the difficulty of the game increases by increasing the number of elements in the predetermined set of elements by predetermined rules.

78. The non-transitory computer readable medium for playing a game of chance according to claim 76, wherein the difficulty of the game increases by increasing the number of objects in the grid of objects.

79. The non-transitory computer readable medium for playing a game of chance according to claim 78, wherein the difficulty of the game increases by increasing the number of predetermined groups in the grid of objects.

80. The non-transitory computer readable medium for playing a game of chance according to claim 78, wherein the difficulty of the game increases by increasing the number of objects in each predetermined group in the grid of objects.

81. A method for conducting a game of chance via a non-transitory computer readable medium comprising:

a) providing, via a processor, for each of a plurality of players, a grid of objects wherein each object is chosen from a predetermined set of elements automatically by a game-playing computer system;

b) providing, via the processor, for randomly selecting one element from a predetermined set of elements;

c) providing, via the processor, for removing at least one object from the grid of objects when the selected element matches at least one object in the grid of objects such that the selected element determines the at least one object removed from the grid of objects; and d) determining, via the processor, a payout to at least one of the plurality of players upon at least one of the plurality of the players reaching a winning outcome, wherein reaching the winning outcome includes removing all objects from the grid of objects.

82. The method according to claim 81, wherein objects are arranged into one or more predetermined groups in the grid of objects, and wherein reaching the winning outcome includes removing all objects from at least one of the one or more predetermined groups.

* * * * *